United States Patent [19]
Senechal et al.

[11] Patent Number: 6,167,547
[45] Date of Patent: Dec. 26, 2000

[54] AUTOMATIC SELF-TEST SYSTEM UTILIZING MULTI-SENSOR, MULTI-CHANNEL REDUNDANT MONITORING AND CONTROL CIRCUITS

[75] Inventors: Raymond R. Senechal, East Hartford; Stephen J. Wilkosz, Vernon, both of Conn.

[73] Assignee: CE Nuclear Power LLC, Windsor, Conn.

[21] Appl. No.: 08/848,556

[22] Filed: Apr. 28, 1997

Related U.S. Application Data

[60] Provisional application No. 60/020,115, Jun. 20, 1996.

[51] Int. Cl.$^7$ .................................................. G01R 31/28
[52] U.S. Cl. ........................................ 714/732; 714/736
[58] Field of Search .................................. 376/215–217, 376/259, 245; 714/732, 734, 736

[56] References Cited

U.S. PATENT DOCUMENTS

| | | | |
|---|---|---|---|
| 3,898,631 | 8/1975 | Brown et al. | 430/173 |
| 4,752,869 | 6/1988 | Miller et al. | 364/187 |
| 4,779,273 | 10/1988 | Beucler et al. | 376/216 |
| 4,804,515 | 2/1989 | Crew et al. | 376/216 |
| 4,989,130 | 1/1991 | Moriyama et al. | 364/200 |
| 5,148,433 | 9/1992 | Johnson et al. | 371/11.3 |
| 5,287,264 | 2/1994 | Arita et al. | |

FOREIGN PATENT DOCUMENTS

| | | |
|---|---|---|
| 0 057 453 | 11/1982 | European Pat. Off. |
| 0 220 900 | 6/1987 | European Pat. Off. |
| 2 183 411 | 6/1987 | United Kingdom. |

*Primary Examiner*—Albert De Cady
*Assistant Examiner*—Samuel Lin
*Attorney, Agent, or Firm*—Henry T. Crenshaw, Jr. Esq.; Ronald P. Kananen; Rader, Fishman & Grauer

[57] ABSTRACT

An automatic self-testing system includes a plurality of sensor processing channels or paths each having a sensor for providing, either directly or indirectly, a digital value to a comparator which compares the measured value with pre-determined value that is, in turn, provided to coincidence logic that evaluates the output of its comparator with the output of the comparators of the other paths to provide an output indicative of a pass/fail condition. Each sensor processing path includes two sub-paths that can be associated with or switched into the processing path while the disassociated sub-path undergoes off-line testing by a test processor. Testing is effected by providing a digital value to the sub-path under test while sensing the output to determine the functional validity of the sub-path under test. The combinational logic state of the system is monitored and converted into a decimal value that is compared with the set of decimal values corresponding to the finite known-good logic states of the system. The appearance of a decimal value that is not a member of the set of decimal values for the known-good logic states is thus an indication of a failure.

2 Claims, 4 Drawing Sheets

| BINARY STATES | | | | | | | | | DECIMAL VALUE |
|---|---|---|---|---|---|---|---|---|---|
| $2^8$ | $2^7$ | $2^6$ | $2^5$ | $2^4$ | $2^3$ | $2^2$ | $2^1$ | $2^0$ | |
| CHAN. A BYPASS | CHAN. B BYPASS | CHAN. C BYPASS | CHAN. D BYPASS | CHAN. A BISTABLE COMP. TRIP | CHAN. B BISTABLE COMP. TRIP | CHAN. C BISTABLE COMP. TRIP | CHAN. D BISTABLE COMP. TRIP | COINCIDENCE LOGIC OUTPUT | RESULT |
| 0 | 0 | 0 | 0 | 0 | 0 | 0 | 0 | 0 | 0 |
| 0 | 0 | 0 | 0 | 0 | 0 | 0 | 1 | 0 | 2 |
| 0 | 0 | 0 | 0 | 0 | 0 | 1 | 0 | 0 | 4 |
| 0 | 0 | 0 | 0 | 0 | 0 | 1 | 1 | 1 | 7 |
| 0 | 0 | 0 | 0 | 0 | 1 | 0 | 0 | 0 | 8 |
| 0 | 0 | 0 | 0 | 0 | 1 | 0 | 1 | 1 | 11 |
| 0 | 0 | 0 | 0 | 0 | 1 | 1 | 0 | 1 | 13 |
| 0 | 0 | 0 | 0 | 0 | 1 | 1 | 1 | 1 | 15 |
| 0 | 0 | 0 | 0 | 1 | 0 | 0 | 0 | 0 | 16 |
| 0 | 0 | 0 | 0 | 1 | 0 | 0 | 1 | 1 | 19 |
| 0 | 0 | 0 | 0 | 1 | 0 | 1 | 0 | 1 | 21 |
| 0 | 0 | 0 | 0 | 1 | 1 | 0 | 0 | 1 | 25 |
| 0 | 0 | 0 | 0 | 1 | 1 | 0 | 1 | 1 | 27 |
| 0 | 0 | 0 | 0 | 1 | 1 | 1 | 0 | 1 | 29 |
| 0 | 0 | 0 | 0 | 1 | 1 | 1 | 1 | 1 | 31 |
| 0 | 0 | 0 | 1 | 0 | 0 | 0 | 0 | 0 | 32 |
| 0 | 0 | 0 | 1 | 1 | 0 | 0 | 0 | 0 | 48 |
| 0 | 0 | 0 | 1 | 1 | 0 | 0 | 1 | 0 | 50 |
| 0 | 0 | 0 | 1 | 1 | 0 | 1 | 0 | 0 | 52 |
| 0 | 0 | 0 | 1 | 1 | 1 | 0 | 0 | 0 | 56 |
| 0 | 0 | 0 | 1 | 1 | 1 | 0 | 1 | 1 | 59 |
| 0 | 0 | 0 | 1 | 1 | 1 | 1 | 0 | 1 | 61 |
| 0 | 0 | 0 | 1 | 1 | 1 | 1 | 1 | 1 | 63 |
| ETC. | ETC. | ETC. | ETC. | ETC. | ETC. | ETC. | ETC. | ETC. | ETC. |

| BINARY STATES | | | | | | | | | DECIMAL VALUE |
|---|---|---|---|---|---|---|---|---|---|
| $2^8$ CHAN. A BYPASS | $2^7$ CHAN. B BYPASS | $2^6$ CHAN. C BYPASS | $2^5$ CHAN. D BYPASS | $2^4$ CHAN. A BISTABLE COMP. TRIP | $2^3$ CHAN. B BISTABLE COMP. TRIP | $2^2$ CHAN. C BISTABLE COMP. TRIP | $2^1$ CHAN. D BISTABLE COMP. TRIP | $2^0$ COINCIDENCE LOGIC OUTPUT | RESULT |
| 0 | 0 | 0 | 0 | 0 | 0 | 0 | 0 | 0 | 0 |
| 0 | 0 | 0 | 0 | 0 | 0 | 0 | 1 | 0 | 2 |
| 0 | 0 | 0 | 0 | 0 | 0 | 1 | 0 | 0 | 4 |
| 0 | 0 | 0 | 0 | 0 | 0 | 1 | 1 | 1 | 7 |
| 0 | 0 | 0 | 0 | 0 | 1 | 0 | 0 | 0 | 8 |
| 0 | 0 | 0 | 0 | 0 | 1 | 0 | 1 | 1 | 11 |
| 0 | 0 | 0 | 0 | 0 | 1 | 1 | 0 | 1 | 13 |
| 0 | 0 | 0 | 0 | 0 | 1 | 1 | 1 | 1 | 15 |
| 0 | 0 | 0 | 0 | 1 | 0 | 0 | 0 | 0 | 16 |
| 0 | 0 | 0 | 0 | 1 | 0 | 0 | 1 | 1 | 19 |
| 0 | 0 | 0 | 0 | 1 | 0 | 1 | 0 | 1 | 21 |
| 0 | 0 | 0 | 0 | 1 | 1 | 0 | 0 | 1 | 25 |
| 0 | 0 | 0 | 0 | 1 | 1 | 0 | 1 | 1 | 27 |
| 0 | 0 | 0 | 0 | 1 | 1 | 1 | 0 | 1 | 29 |
| 0 | 0 | 0 | 0 | 1 | 1 | 1 | 1 | 1 | 31 |
| 0 | 0 | 0 | 1 | 0 | 0 | 0 | 0 | 0 | 32 |
| 0 | 0 | 0 | 1 | 1 | 0 | 0 | 0 | 0 | 48 |
| 0 | 0 | 0 | 1 | 1 | 0 | 0 | 1 | 0 | 50 |
| 0 | 0 | 0 | 1 | 1 | 0 | 1 | 0 | 0 | 52 |
| 0 | 0 | 0 | 1 | 1 | 1 | 0 | 0 | 0 | 56 |
| 0 | 0 | 0 | 1 | 1 | 1 | 0 | 1 | 1 | 59 |
| 0 | 0 | 0 | 1 | 1 | 1 | 1 | 0 | 1 | 61 |
| 0 | 0 | 0 | 1 | 1 | 1 | 1 | 1 | 1 | 63 |
| ETC. | ETC. | ETC. | ETC. | ETC. | ETC. | ETC. | ETC. | ETC. | ETC. |

FIG. 4

AUTOMATIC SELF-TEST SYSTEM UTILIZING MULTI-SENSOR, MULTI-CHANNEL REDUNDANT MONITORING AND CONTROL CIRCUITS

CROSS REFERENCE TO RELATED APPLICATIONS

The subject matter of the present application is disclosed in applicants' co-pending Provisional U.S. Patent Application No. 60/020,115, filed Jun. 20, 1996, from which priority is claimed.

BACKGROUND OF THE INVENTION

The present invention relates generally to automatic self-testing systems in industrial control systems, such as nuclear power plants, including automatic testing of safety control systems utilizing multi-sensor, multichannel redundant monitoring and control circuits.

Industrial control systems, including process control systems, will often include redundant monitoring and control paths to assure reliable operation. It is not uncommon to use a plurality of sensors to sense a single parameter and to process the output of the plural sensors through independent processing paths so that each path provides an output to a combinational logic array which, in turn, provides an output representative of the various processing paths. While "designed-in" redundancy assures a higher level of operational reliability, the various redundant paths and the related logic are themselves a potential failure source.

In the nuclear power industry, it is common to use several levels of redundancy to assure that a particular measurement is valid. In nuclear power plants, independent shut-down and safe-operation systems are dedicated to monitoring plant operation and evaluating numerous safety-related parameters. In the event one or more measured parameters indicate the existence of an unsafe condition, the shut-down system and/or the safe-operation system can automatically effect the appropriate remedial action. It is imperative that these safety control systems, known as plant protection systems, operate reliably, and, accordingly, it is imperative that all measured and sensed parameters be valid.

In the context of nuclear plant protection systems, it is not uncommon to measure a multitude of parameters related to plant operation. These parameters include, for example, temperatures, pressures, flow rates, power density, neutron flux, fluid levels, etc. Other functions of the plant protection system include the status-monitoring of various components including valves, pumps, motors, control devices, and generators.

Additionally, the plant protection system, under certain defined conditions, may initiate a reactor trip (RT), i.e., the rapid, controlled, and safe shut-down of the reactor. In the case of a pressurized light water reactor, the shut-down is often accomplished by the lowering of moderating control rods into the reactor core to cause the reactor to become sub-critical.

The practice of using redundant sensors and related processing circuitry (i.e., channels) is well known. Typically, three or four identical sensors may be used to monitor any given plant parameter or component status with each sensor outputting its measured value into an independent processing channel. While the use of multiple sensors and channels increases the probability that a measured value for a parameter is valid, the increased hardware also increases the probability that one of the redundant channels will experience an intra-channel failure that will produce an output in conflict with the other channels.

The prospect of an intra-channel failure has been addressed by comparing the output of all the redundant channels and providing an output that is based upon an arbitrary voting algorithm. For example, simple combinational logic devices, such as AND gates and OR gates, are used to accomplish the voting algorithm. In a two-out-of-four logic scheme, two or more of four independent sensor paths must be in agreement before the coincidence logic will yield an output to indicate a particular condition.

SUMMARY OF THE INVENTION

It is therefore an object of the present invention to provide an improved automatic test system for parameter sensing and processing circuits.

It is another object of this invention to provide an improved automatic self-testing system and method for parameter sensing circuits so as to provide greater reliability.

It is still a further object of this invention to provide an improved automatic self-testing system and method for parameter sensing circuits wherein all necessary circuits may remain operational during routine testing.

It is still another object of this invention to provide a scheme by which the various logic states of parameter sensing circuits can be efficiently evaluated for operational validity.

In view of these objects, and others, the present invention provides an automatic test system well suited for use in industrial control systems, including nuclear power plants, in which high-reliability operation must be assured and in which operational failures must be quickly identified.

In a system in which a parameter is sensed by a plurality of independent processing paths, each path is provided with parallel redundant sub-paths that can each be sequentially inserted into the processing path to effect normal processing or disassociated from the processing path to effect testing. The sub-path that is disassociated from the signal processing path is then subject to an operational test or tests by a program-controlled test processor that presents a pre-determined test signal to the sub-path under test while monitoring the output or outputs thereof to identify an anomalous condition. The test processor tests each sub-path in sequence on a recurring basis. In addition, the finite known-good logic states of the various processing paths are converted into a decimal value that is compared by the test processor to a set of known-good values; a decimal value that does not correspond to a known-good value thus represents a possible failure condition.

In the preferred form of the invention, a parameter is subjected to sensing by a plurality of sensors and sensor-specific processing channels or paths. Each sensor provides, either directly or indirectly, a digital value to a comparator which compares the measured value with a pre-determined value that is, in turn, provided to coincidence logic that evaluates the output of its comparator with the output of the comparators of the other processing paths to provide an output indicative of a pass/fail condition. Each sensor processing path includes two sub-paths that can be associated with or switched into the processing path while the disassociated sub-path undergoes off-line testing by a test processor. Testing is effected by providing a digital value to the sub-path under test while sensing the output to determine the functional validity of the sub-path under test. The testing continues until a failure indication is sensed for a particular sub-path at which time that sub-path is isolated and an appropriate alarm indication provided.

Additionally, the various nodes of the system having either a binary one or zero value are assigned a unique base-two binary place-value. The combinational logic state of the system is determined by arithmetically adding the place-values of the binary one values to generate a corresponding decimal value which, in turn, is compared with the set of decimal values corresponding to the finite set of known-good logic states of the system. The appearance of a decimal value that is not a member of the set of decimal values for all known-good logic states is thus an indication of a failure condition.

The present invention advantageously provides an automatic self-testing system for verifying both the signal path processing functions and the validity of various logic states in parameter sensing systems, particularly parameter sensing systems using multiple redundant processing paths.

Other objects and further scope of applicability of the present invention will become apparent from the detailed description to follow, taken in conjunction with the accompanying drawings, in which like parts are designated by like reference characters.

BRIEF DESCRIPTION OF THE DRAWING

FIG. 4 is a table representing various logic states for the system of FIG. 2.

DESCRIPTION OF THE PREFERRED EMBODIMENT

Figure 1:
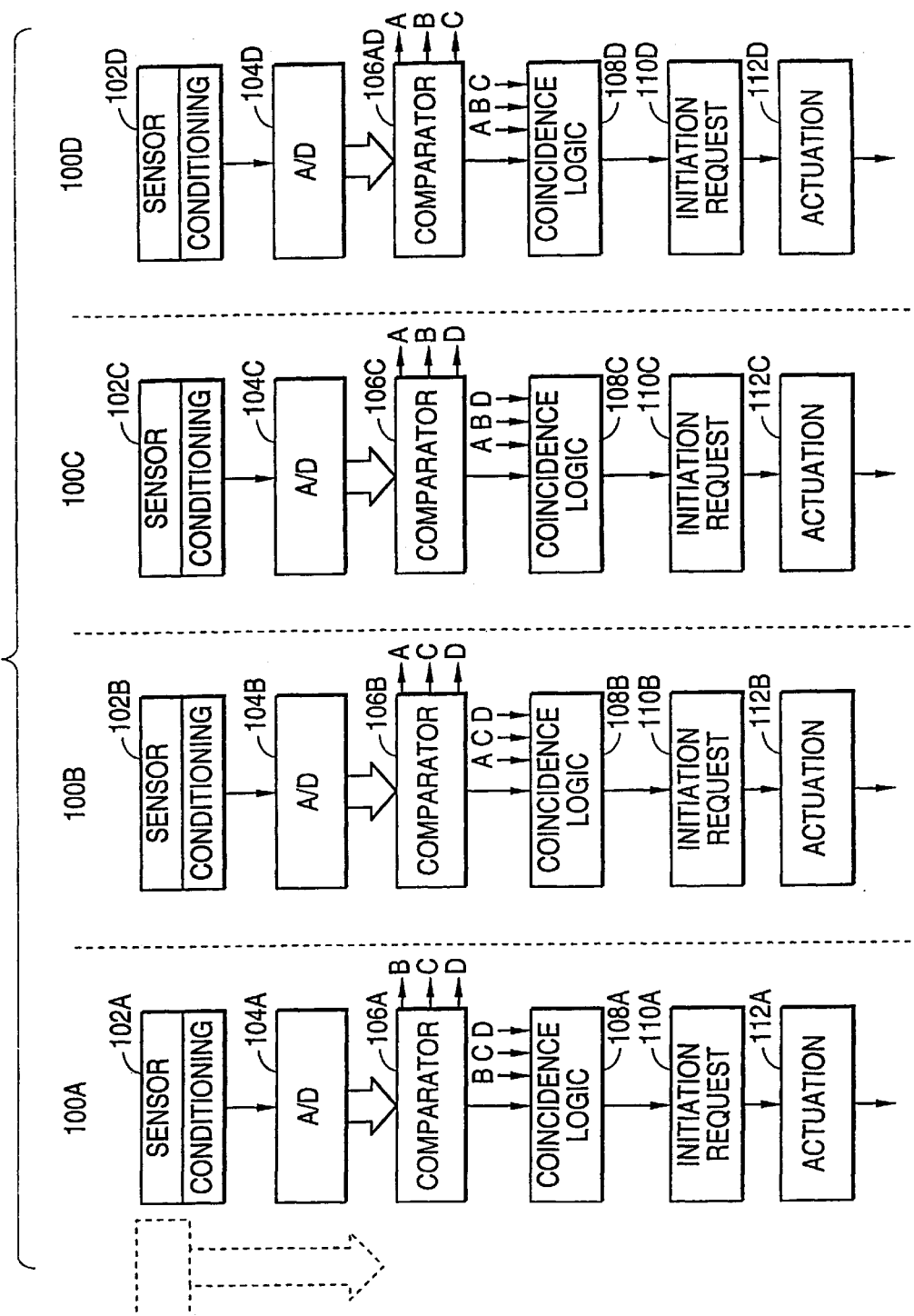
FIG. 1 is a block diagram of multiple signal processing paths for measuring a specific parameter.

The automatic self-testing system of the present invention is utilized with a signal processing topology of the type shown in FIG. 1 and designated generally therein by the reference character 100. As shown, the signal processing topology is defined by four representative independent signal processing paths 100A, 100B, 100C, and 100D that are interconnected as described below. As shown on the left in FIG. 1, the processing path 100A includes a sensor 102A; an analog-to-digital (A/D) converter 104A; a bi-stable comparator 106A; a coincidence logic unit 108A; a trip-initiation logic unit 110A; and a trip-actuation logic unit 112A. The bi-stable comparator 106A outputs signals B, C, and D to the coincidence logic units 108B, 108C, and 108D of the other signal processing paths while the coincidence logic unit 108A accepts signals B, C, and D from the bi-stable comparators 106B, 106C, and 106D of the other signal processing channels.

The sensor 102A is designed to measure a parameter, such as temperature, pressure, flux, voltage, current, displacement, position, or the like. The output of the sensor 102 may be subjected to some type of signal conditioning (i.e., amplification, scaling, filtering, etc.) and is then presented to the A/D converter 104A for conversion into a multi-bit digital value. In those cases where the sensor 102A provides a direct digital output, viz., in the case of certain optical shaft encoders and linear displacement encoders, the digital output can be provided from the sensor 102A directly to the bi-stable comparator 106A s represented in a dotted-line illustration on the left of the signal processing path 100A in FIG. 1.

In the case where the sensor 102A is of the analog type, the A/D converter 104A translates the value of the analog signal from the sensor 102A into a digitally represented signal that is then presented to the bi-stable comparator 106A. The measured value is compared in the bi-stable comparator 106A with a predetermined set point stored in memory. The set point may be a fixed or static value or a floating or variable value that varies under certain transient operating conditions (i.e., during start-up conditions). The bi-stable comparator 106A, when determining that a parameter exceeds a limit (or is not within an acceptable range), generates a trip-indication signal which is outputted directly to its coincidence logic unit 108A, and, additionally, outputted as trip-indication signals B, C, and D to the coincidence logic units 108B, 108C, and 108D of the three other signal processing paths 100B, 100C, and 100D. The interconnection between the bi-stable comparator of any path and the coincidence logic units of the other path is preferably by optical fiber. The electrical output of each bi-stable comparator is converted by an electro-optic coupler for transmission by optical fiber to the other coincidence logic units where it is converted to an electrical value by an opto-electric coupler. Thus, the coincidence logic unit of each signal processing path will receive the output of its bi-stable comparator and any trip-indication signals from the bi-stable comparators of other three respective signal processing paths. Accordingly, each coincidence logic unit receives an output of all the bi-stable comparators.

The bi-stable comparators have two stable operating states, i.e., a first state in which the set point has not been exceeded by the sensed value and a second state in which the set point has been exceeded by the sensed value.

The coincidence logic unit 108A, under proper conditions, outputs a signal to the trip-initiation logic 110A which, in turn, outputs a signal to the trip-actuation logic 112A which implements the requested "trip". In the context of a nuclear power control system, a "trip" can initiate a set of procedures for efficient and safe shut-down of the nuclear reactor.

The signal processing pathways 10B, 100C, and 100D are configured in a manner like that of the signal processing pathway 10A. The signal processing paths 100A–100D are physically separated from each other, as symbolically illustrated by the broken vertical lines between each processing path in FIG. 1. Signal communication between the bi-stable comparator of each signal processing path and the coincidence logic units of the other signal processing paths is preferably by optical cable, as mentioned above, to insure a measure of inter-path electrical isolation.

In normal operation, the sensors 102A–102D monitor the measured variable and provide an output to their respective A/D converters with the digital output of each A/D converter provided to its respective bi-stable comparator. As long as the digital value of the measured parameter does not exceed its set point, a "trip" signal is not outputted by the comparator to its coincidence logic unit and the coincidence logic units of the other signal processing paths.

Conversely, if the measured parameter should exceed its set point, at least one of the bi-stable comparators will output a "trip indication signal" to its coincidence logic units and the coincidence logic units of the remaining signal processing paths. If any two of the four inputs of a coincidence logic unit represent trip indication signals, that coincidence logic unit will output a trip-demand signal to its trip initiation unit which will, in turn, output to its trip-actuation logic. Thus, a signal appearing at the output of any one of the trip-actuation logic units, 112A–112D, will indicate that the measured parameter has exceeded its set point in at least two of the four channels.

Figure 2:
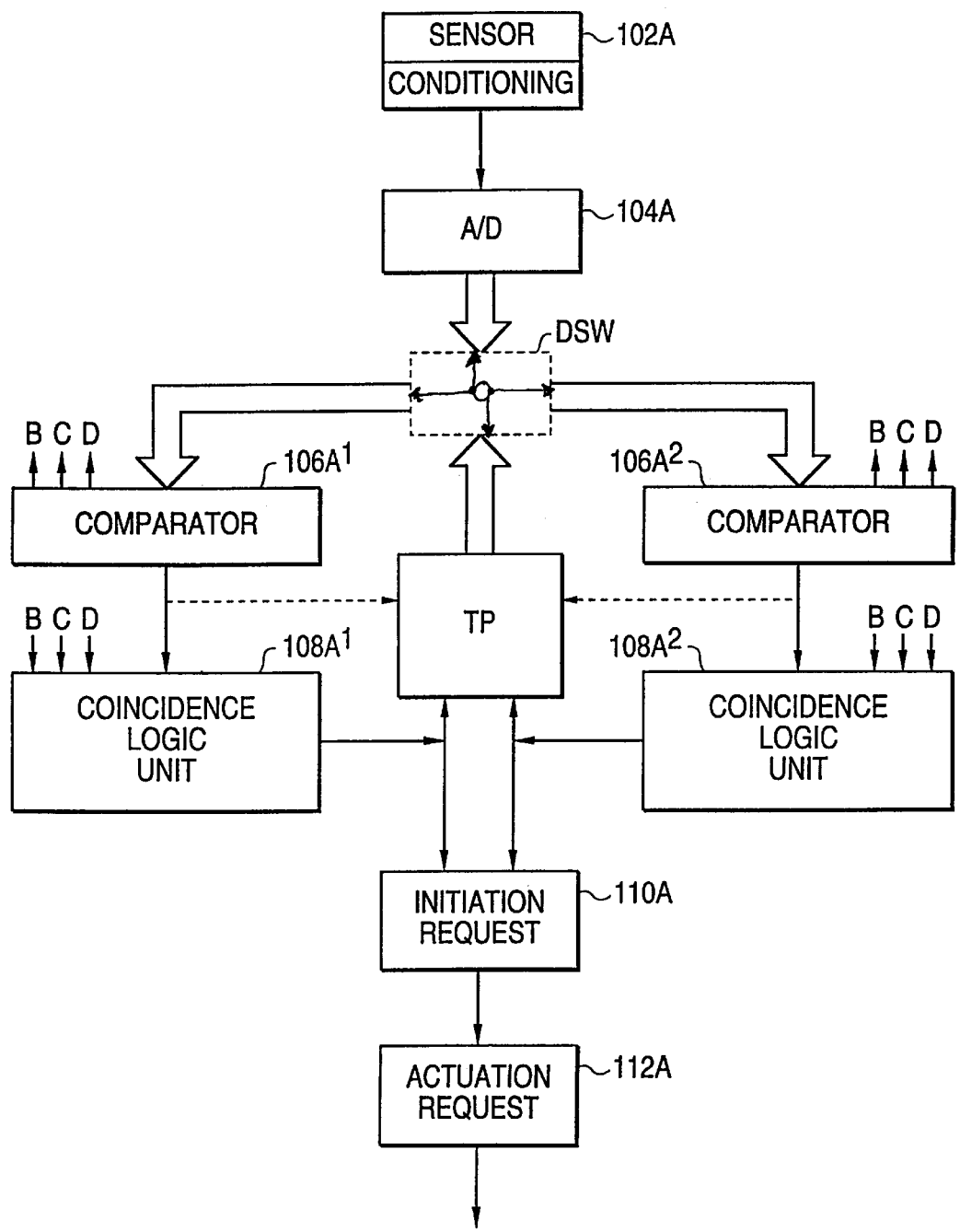
FIG. 2 is a block diagram of a single processing path of FIG. 1 in accordance with the present invention.

In accordance with the present invention, the signal processing paths can be subjected to intra-path testing, as represented in FIG. 2, in which the signal processing path 100A has been shown. As can be appreciated, the signal processing path 100A shown in FIG. 2 is representative of similarly configured, signal processing paths 10B, 100C, and 100D.

As shown in FIG. 2, the processing path subsequent to the A/D converter 104 is bifurcated into two parallel paths including a first bi-stable comparator $106A^1$ and a second bi-stable comparator $106A^2$. The multi-bit data path from the A/D converter 104 can be associated or disassociated with either of the first and second bistable comparators $106A^1$ and $106A^2$. Each bi-stable comparator $106A^1$ and $106A^2$ outputs to a respective coincidence logic unit $108A^1$ and $108A^2$ and also outputs to the coincidence logic units of the other signal processing paths as described above in relation to FIG. 1.

A program-controlled test processor TP includes a multi-bit data output that is selectively connectable to the data path from the A/D converter 104A to the bi-stable comparator $106A^1$ or the bi-stable comparator $106A^2$. As represented symbolically in dotted-line fashion, the test processor TP controls a data switch DSW or the functional equivalent that allows the test processor TP to present a test word to one or the other of the two bi-stable comparators $106A^1$ or $106A^2$ while the other of the bi-stable comparators accepts the output of the A/D converter 104A. In addition, the outputs of the coincidence logic units $108A^1$ and $108A^2$ are connected to the test processor TP, and, if desired, the outputs of the bi-stable comparators $106A^1$ and $106A^2$ are independently connected (as shown in dotted line) to-the test processor TP.

The outputs of the coincidence logic units $108A^1$ and $108A^2$ connect to the serially connected trip-initiation logic 110A and the trip-actuation logic 112A as described above in relation to FIG. 1.

In normal operation, one or the other of the subpaths is disassociated from the signal processing path while the other path effects signal processing as described above. In the context of FIG. 2 and assuming that the sub-path defined by bi-stable comparator $106A^1$ and coincidence logic unit $108A^1$ are functioning in the signal processing path 100A, the sub-path defined by bi-stable comparator $106A^2$ and coincidence logic unit $108A^2$ is available for testing. In this configuration, the test processor TP has disassociated the multi-bit data output of the A/D converter 104A from the input of the bi-stable comparator $106A^2$. The test processor TP, either under command from an internal firmware sequence and/or from a supervisory computer (not shown), initiates the test sequence by momentarily impressing an arbitrary test value onto the input of the bi-stable comparator $106A^2$ while also monitoring the output of the coincidence logic unit $108A^2$. Thus, the sensed output of the coincidence logic unit $108A^2$ in response to the arbitrary test value applied to the input of the bi-stable comparator $106A^2$ represents the pass/fail status of the sub-path. If desired and as represented by the dotted lines from the output of the bistable comparator $106A^2$, the test processor TP can also sense the output of the bi-stable comparator $106A^2$ in addition to the output of the coincidence logic unit $108A^1$.

In accordance with one aspect of the present invention, the integrity of the processing path between the bi-stable comparator $106A^2$ and the coincidence logic unit $108A^2$ and between the coincidence logic unit $108A^2$ and the trip initiation logic unit 110A is maintained (i.e., not interrupted) since a momentary "failed" output from the coincidence logic unit $108A^2$ under test will not cause a spurious trip initiation signal in view of the two-out-of-four voting system described above.

The test value provided to the bi-stable comparator $106A^2$ by the test processor TP can be a single value or a sequence of different values intended to exercise the subpath under test. In the preferred embodiment, the test processor provides a single digital value that is derived from a stored value representative of the complement of the expected "pass" value of the parameter. More specifically, the normal or expected "pass" value for the measured parameter, in binary form, is complemented (i.e., inverted) and that complement value is then used as the test value presented by the test processor TP to the bistable comparator $106A^2$. Thus, in the case where the known or expected value of the parameter is FE 5C 13 07 (hexadecimal), the test processor TP uses the complement of this value, i.e., 01 A3 EC F8, as the interrogation value presented to the bi-stable comparator $106A^2$.

Once the test processor TP concludes the test of one of the sub-paths, the other sub-path is available for testing. The test processor TP associates (i.e., connects) the output of the A/D converter 104A with the input of the bi-stable comparator in one of the sub-paths while disassociating the bi-stable comparator of the other of the sub-paths and begins the test of the now disassociated test path. The test sequence is repeated on a channel-by-channel basis in a recurring manner under the control of firmware internal to the test processor TP and/or a supervisory computer (not shown).

Figure 3:
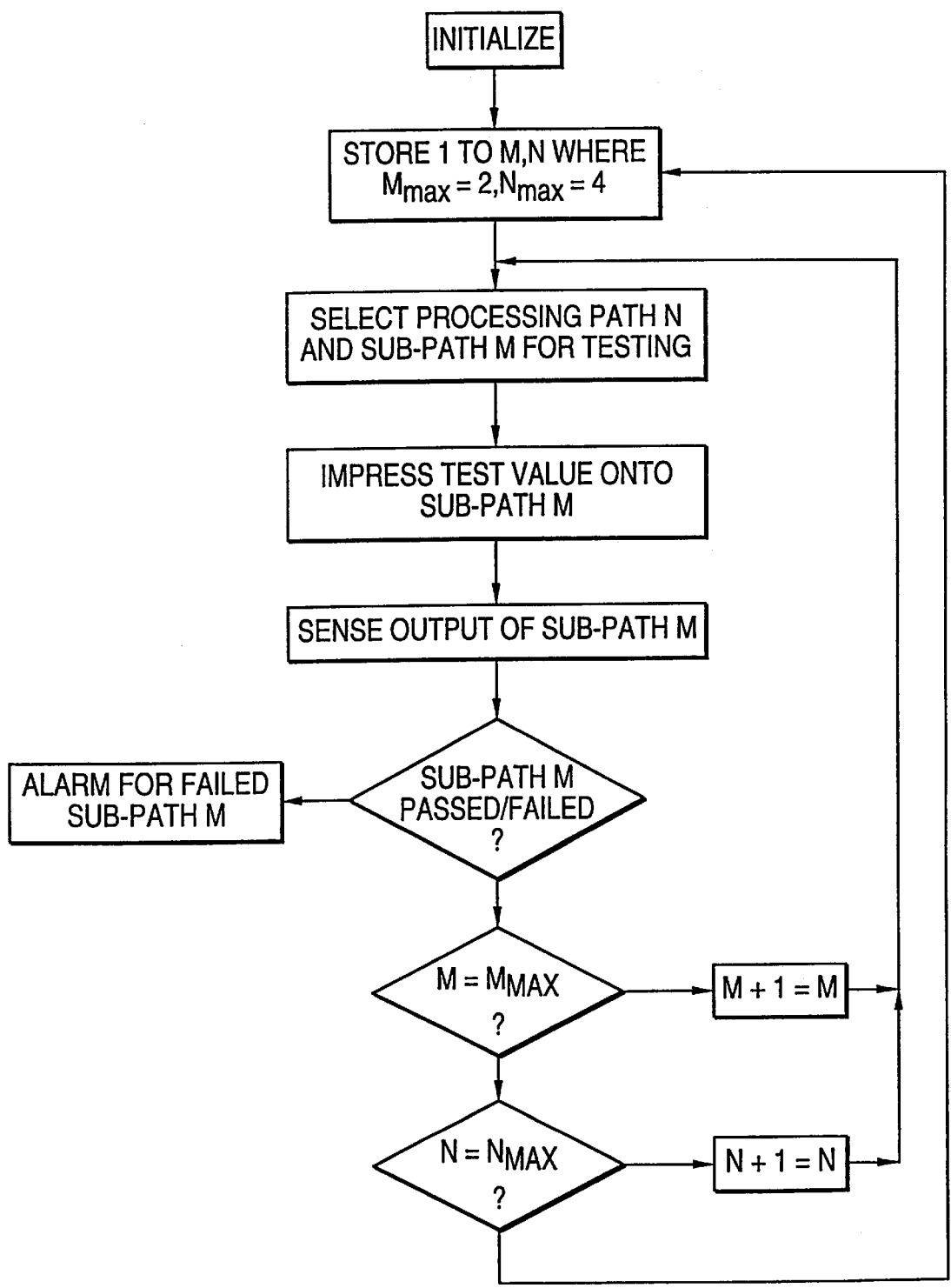
FIG. 3 is a simplified flow diagram indicating the test sequence of the block diagram of FIG. 2.

As represented by the flow diagram in FIG. 3 and in the context of the four signal processing paths shown in FIG. 1 and modified in accordance with the improvement of FIG. 2, the eight sub-paths can be tested in seriatim under a schedule determined by a supervising computer. In FIG. 3, the variable M represents the number of sub-paths $M_{max}=2$) and the variable N represents the number of signal processing channels ($N_{max}=4$). If a sub-path fails its test, that sub-path is isolated and an appropriate alarm or other indication provided to initiate remedial action or repair.

Digital systems utilizing combinational and sequential logic and firmware-driven processors, such as the systems presented in FIGS. 1 and 2, have a finite number of logic states that are a function of the various inputs. Thus, each node within the system that can assume either a binary one or binary zero value represents a component of a particular logic state for the system. In general, the unique logic states can be presented in a tabular or map form, (i.e., analogous to a truth table or Karnaugh map) in which each row of the table represents a unique binary frame of selected bit width corresponding to a unique known-good logic state for the system. As shown in the matrix of FIG. 4, each row and column position presents the binary value of a selected node in the system with the entire row representing a known-good logic state for a four channel system in which each channel is configured as shown in FIG. 2. As the size of the system increases, the width of the binary frame representing the logic state can increase dramatically and can require unusually wide data buses to effect comparisons with the set of binary frame representative of the known-good logic states.

In accordance with one feature of the present invention and as shown in FIG. 4, each node or selected ones of the nodes are assigned a binary place-value (i.e., $2^0$, $2^1$, $2^2$, $2^3$, $2^4$, $2^5$, $2^6$, $2^7$, and $2^8$ in accordance with the classic base-two binary system. In the case of the table of FIG. 4, the most significant bit is on the left side of the table. In accordance with the present invention, the binary states (0 or 1) for the various nodes are summed in accordance with their base ten digital value (i.e., 0, 2, 4, 8, 16, 32, 64, 128, and 264) as shown in the rightmost column. Thus, for any row in the table of FIG. 4, the base two place-value of the various binary zero and binary one values, when their decimal equivalents are summed, represents a unique base ten decimal value. The test processor TP, as part of its test sequence, calculates the base ten decimal equivalent of the sensed binary logic state and then compares that decimal value with a table of known-good values. If a match is found, the logic state is a valid state; conversely, if no match is found, a possible fault is indicated. The use of the decimal equivalent allows for the efficient detection of a logic state for the system that is not one of the known-good logic states.

While the arrangement of FIG. 4 effects an arithmetic conversion between radix two and radix ten counting systems, other conversion schemes that are non-decimal are within the scope of the invention, e.g., binary to octal or binary to hexadecimal.

The present invention advantageously provides an automatic test system for verifying both signal path processing function and the validity of various logic states in parameter sensing systems, particularly parameter sensing systems using multiple redundant processing paths.

As will be apparent to those skilled in the art, various changes and modifications may be made to the illustrated automatic self-testing system of the present invention without departing from the spirit and scope of the invention as determined in the appended claims and their legal equivalent.

What is claimed is:

1. A method of determining the operational validity of a logic network having a plurality of nodes, each node having either a binary one or a binary zero state, the method comprising the steps of:

assigning a unique binary place-value to each node;

determining the binary state of each node to provide a determined binary state of each node;

calculating the decimal equivalent of the determined binary state of each node, in accordance with the unique binary place value assigned to each node, to provide a calculated decimal equivalent for each node;

summing together the calculated decimal equivalent for each node to provide a summed decimal value;

comparing the summed decimal value to a set of decimal values defining valid logic states for the logic network; and determining the operational validity of the logic network, wherein valid operation is determined when the summed decimal value matches one of the set of decimal values defining valid logic states.

2. A method of determining the operational validity of a logic network having a plurality of nodes, each node having either a binary one or a binary zero state, the method comprising the steps of:

assigning a unique binary place-value to each node;

determining the binary state of each node to provide a determined binary state of each node;

calculating a non-decimal equivalent of the determined binary state of each node, in accordance with the unique binary place value assigned to each node, to provide a calculated non-decimal equivalent for each node;

summing together the calculated non-decimal equivalent for each node to provide a summed non-decimal;

comparing the summed non-decimal value to a set of non-decimal values defining valid logic states for the logic network; and determining the operational validity of the logic network, wherein valid operation is determined when the summed non-decimal value matches one of the set of non-decimal values defining valid logic states.

* * * * *